(No Model.) 2 Sheets—Sheet 1.

W. P. BETTENDORF.
METALLIC FRAME FOR WAGONS.

No. 508,200. Patented Nov. 7, 1893.

Witnesses
Raymond F. Barnes.
J. G. Jones.

Inventor
W. P. Bettendorf
By P. T. Dodge
Attorney (No Model.) 2 Sheets—Sheet 2.
W. P. BETTENDORF.
METALLIC FRAME FOR WAGONS.
No. 508,200. Patented Nov. 7, 1893.
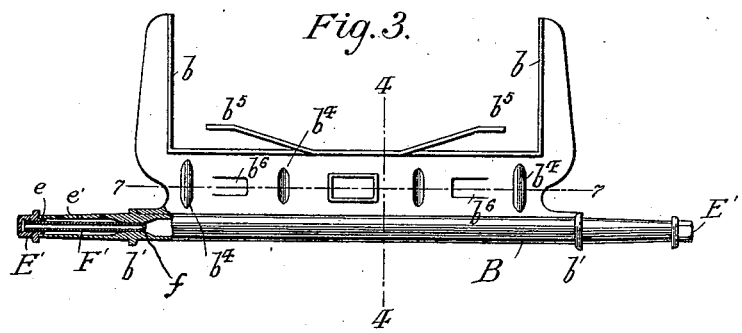
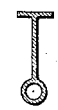
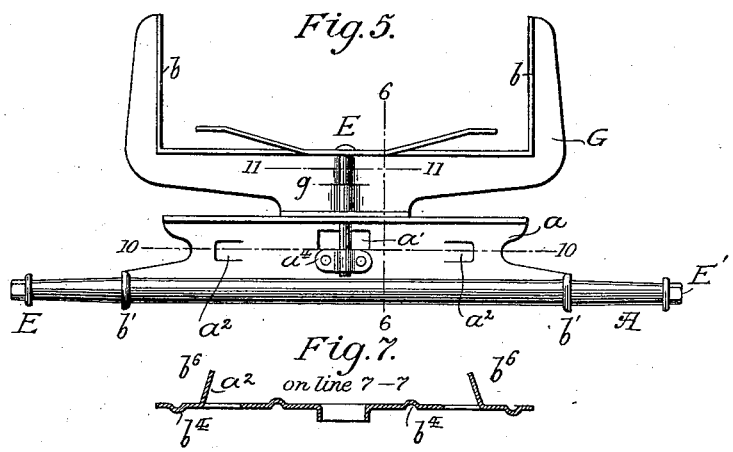
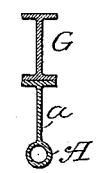
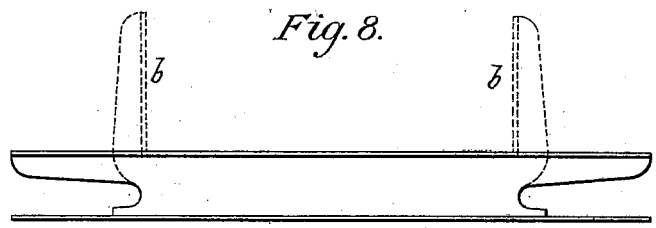
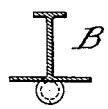
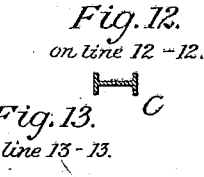
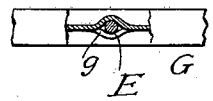
Witnesses
Raymond H. Barnes
J. G. Jones
Inventor
W. P. Bettendorf
By P. T. Dodge
Attorney
THE NATIONAL LITHOGRAPHING COMPANY,
WASHINGTON, D. C.

UNITED STATES PATENT OFFICE.

WILLIAM P. BETTENDORF, OF DAVENPORT, IOWA.

METALLIC FRAME FOR WAGONS.

SPECIFICATION forming part of Letters Patent No. 508,200, dated November 7, 1893.

Application filed August 29, 1891. Serial No. 404,143. (No model.)

*To all whom it may concern:*

Be it known that I, WILLIAM P. BETTENDORF, of Davenport, county of Scott, and State of Iowa, have invented a new and useful Improvement in Metallic Frames for Wagons, &c., of which the following is a specification.

The aim of my invention is to produce a metallic wagon frame which shall consist of a very small number of parts, which may be cheaply constructed, and which shall possess great strength and durability, and to this end it consists in an improved manner of constructing the bolsters, axle, reach and other parts, and in their novel combination with each other, as hereinafter described in detail.

Figure 1:
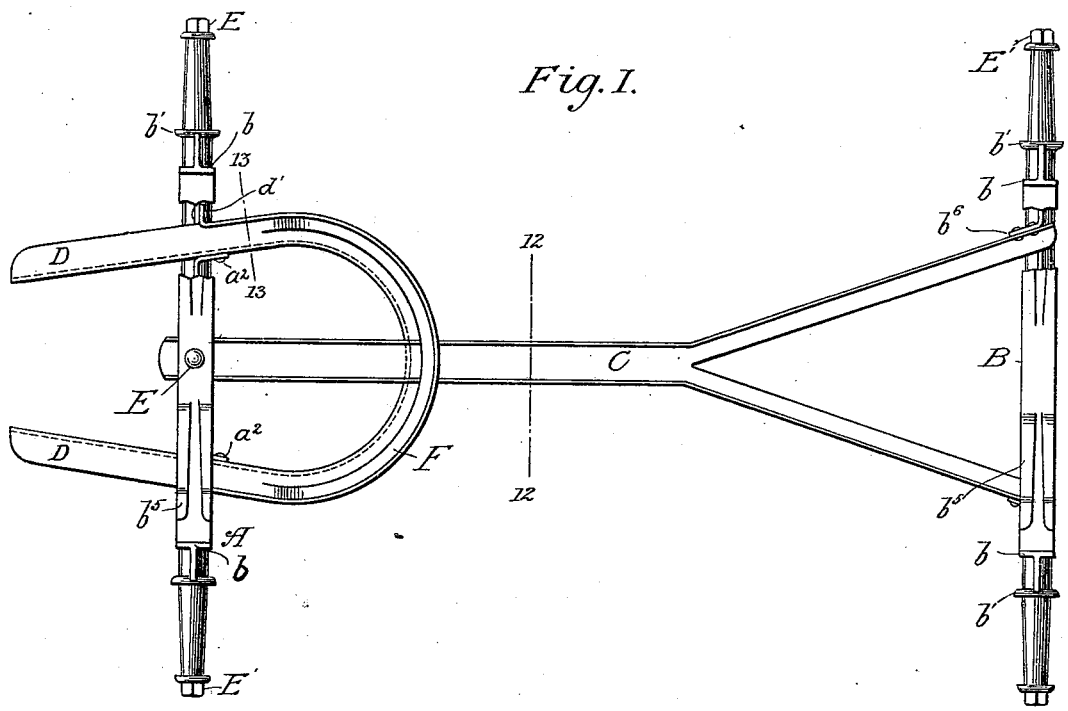
Figure 2:
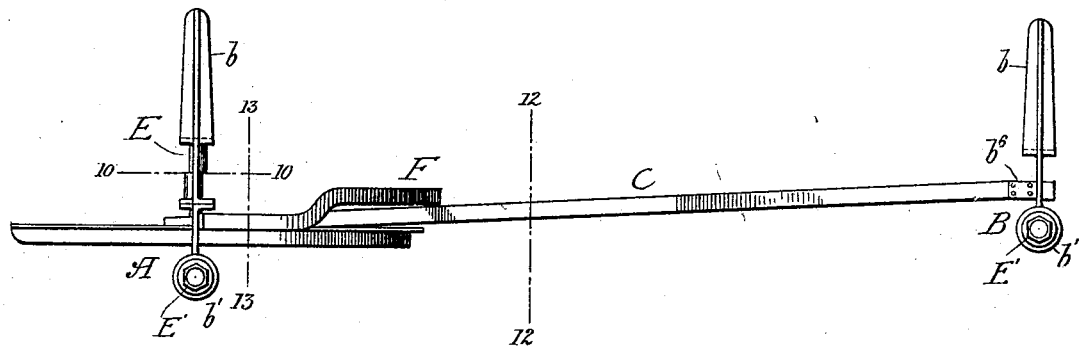

In the accompanying drawings,—Figure 1 is a top plan view of a wagon frame constructed in accordance with my invention. Fig. 2 is a side elevation of the same. Fig. 3 is a rear elevation, one end of the axle being shown in vertical section. Fig. 4 is a vertical section on the line 4—4 of Fig. 3. Fig. 5 is a front end elevation. Fig. 6 is a section on the line 6—6 of Fig. 5. Fig. 7 is a horizontal section through the rear bolster on the line 7—7 of Fig. 3. Fig. 8 is a side view of the blank from which the rear axle, bolster, stakes and springs are formed. Fig. 9 is an end view of the same. Fig. 10 is a horizontal section through the front axle on the line 10—10 of Figs. 2 and 5. Fig. 11 is a horizontal section on the line 11—11 of Fig. 5. Fig. 12 is a cross-section of the reach on the line 12—12 of Figs. 1 and 2. Fig. 13 is a cross-section on the line 13—13 of Figs. 1 and 2.

Referring to the drawings,—A represents the front axle; B, the rear axle; C, the reach or coupling-bar rigidly fixed to the rear axle and jointed to the front axle; E, the king-bolt connecting the reach with the forward axle, and F, the sway-bar or fifth wheel in one piece with the hounds. Each of my axles is constructed complete in one piece from a metal bar of I-form in cross-section. I commonly employ that form of bar shown in Fig. 9, known in the market as "I-beams," having a vertical web with horizontal flanges on both sides, at the top and bottom the upper flange being of less width than that at the base. In forming the rear axle I cut from a beam of this character a blank of the shape shown in Fig. 8. The lower flange or base of this blank is bent downward at its edges until it assumes a tubular form, the two edges being preferably brought together on the under side, as shown in Fig. 9, although they may be left somewhat separated. The tubular portion thus produced by curling or bending the bottom flange forms a hollow axle which although light in weight possesses great strength. The two ends of the upper part of the blank I bend upward, as shown in dotted lines in Fig. 8, and in full lines in Fig. 3, thereby producing integral stakes or standards $b$. The stakes thus formed integral with the axle present wide flat faces on the inner sides to bear against the wagon box or body, and are stiffened by the flat vertical web on the outside so that they are well adapted to resist all the strains to which they are subjected in practice. They are so stiffened and strengthened by their flanges that there is no danger whatever of their being bent or twisted out of shape or out of position.

It will be noted that in the axle and bolster formed as above described, the vertical web of the bar of I section constitutes the bolster, and in the specification the terms web and bolster in this connection are used synonymously.

In order to adapt the ends of the axle to receive the wheels I reduce them by the application of external dies or otherwise to a conical or tapered form, thus producing necks or spindles of the same shape as those in common use and adapted to receive ordinary wheels. At the same time that the spindles are thus given a tapering form I upset the axle in an endwise direction so as to swell it at the middle into the form of annular shoulders $b'$, to bear against the inner ends of the wheel-hub as usual. The axle will be provided at each end with a nut, E', to retain the wheel. This nut may be screwed directly upon the spindles, but I prefer to introduce into the tubular end of the axle a tube F', threading it externally at the inner end and screwing the same tightly into the axle, as shown at $f$, the axle being reduced in diameter at this point internally by the upsetting operation. The tube F' is permitted to project beyond the outer end of the axle and its protruding end is threaded externally to receive the nut E', which is provided with an annular lip, $e$, to fit within the end of the axle in the annular space between the axle and the contained tube. Oil openings $e'$, are formed through the axle and the tube in order to permit the introduction of oil so that they may serve as reservoirs therefor.

It will be observed that the vertical web of the blank rising above the rear axle forms a rear bolster which being of great vertical depth serves at once the purpose of a bolster and a sand-board so that in my structure it is unnecessary to employ as usual, a separate sand-board as at $b^6$ between the axle and bolster.

In order to give the necessary rigidity to the rear bolster without the employment of thick or heavy metal, I press up vertical ribs or corrugations in the web portion, as shown at $b^4$, Figs. 3 and 7, or in any other suitable form which will answer the purpose.

In order to form springs to carry the wagon body I propose to cut the upper flanges of the rear bolster loose from the vertical web from each end inward toward the middle, and to bend the ends which are thus released upward, as shown at $b^5$, Figs. 1 and 3, the spring arms thus formed being rigidly supported at their inner ends and free at their outer ends serve an excellent purpose as spring to underlie the box or body.

From the foregoing description it will be observed that I form the rear axle, its collars, the sand-board as at $b^6$, the bolster, the stakes and the springs all from a single piece of metal so that they are all retained in their proper positions without the employment of bolts, screws or other connections whatever.

I believe myself to be the first to form an axle and a bolster from a single piece of metal, and the first to form the stakes integral with the bolster when the latter is formed in one piece with the axle, and also to make the springs integral with the bolster, and it is to be understood that I lay broad claim to such features of construction, and that the form of the blanks employed and the shape which the several parts are given may be greatly modified within the range of mechanical skill or to suit the fancy of the constructor without departing from the limits of my invention.

In order to permit the connection of the reach with the rear axle I punch lips or tongues $b^6$, out of the vertical web of the rear bolster and bend them forward as shown in Fig. 7.

The reach C, is formed from a single channel-bar or ⊢ beam, and divided longitudinally and centrally from the rear end forward about one-half of its length, the two arms thus produced being spread apart in V-form and serving as the rear hounds. Their rear ends are riveted firmly to the lips $b^6$, of the rear axle, as shown in Figs. 1 and 2. The essence of my invention in this regard consists in constructing the reach or coupling-bar from a single piece of metal bar of ⊢ form in cross section having its rear end divided horizontally and vertically and horizontally spread as described.

The forward axle A, with the sand-board thereover, is formed complete in one piece from an I-beam in essentially the same manner that the rear axle is constructed, the only material difference being that the portions to form the stakes or standards are omitted.

As shown in the drawings, $a$ is the front bolster rising from the front axle and presenting the board horizontally flanged at its top. The web of the front bolster is provided with an opening, $a'$, to receive the forward end of the reach, and is also provided with tongues $a^2$, punched therethrough and turned rearward.

The sway-bar F, is formed from a single bar of metal having the sectional form shown in Fig. 13. This bar is bent into semicircular form at the rear end and its ends extended forward in converging lines to form the hounds D. These hounds are projected through the openings in the front bolster and are riveted firmly to the lips $a^2$, of the bolster before referred to. Each hound has also portions of its upper flange sheared loose and turned outward to form lips, $d'$, which are riveted fast to the front bolster. The rear portion of the part forming the sway-bar proper, is divided vertically and longitudinally through its middle and the upper portion bent upward so that it lies in a horizontal plane above the lower portion, and this for the purpose of permitting the reach-bar C, to be projected forward between them. The upper and lower portions of the sway-bar thus formed embrace the reach between them, and present wide horizontal faces to bear on the upper and lower surfaces of the reach, so that the sway-bar is permitted to turn freely but so guided that it effectually prevents the rolling of the front axle.

The front bolster G, is formed from a single I-beam or channel-bar having its two ends bent upward to form stakes or standards, and having its lower or outer flange sheared away except at the middle where it is left in order to form a broad bearing upon the front axle bolster or sand-board. The front bolster may have its upper flanges sheared loose at the ends and bent upward to form springs identical in all respects with those on the rear bolster, as shown in the drawings. The king-bolt E, is passed downward through the front bolster, the reach and the front sand-board or axle bolster.

In order to afford the proper bearing for the king-bolt in the forward bolster I provide the latter with one or more horizontal incisions $g$, and press the metal on opposite sides of the incision forward and backward respectively, as shown in Fig. 11, thus forming loops or eyes for the passage of the bolt, the top and bottom flanges being of course drilled for its passage. The upper flange on the axle is also drilled for the passage of the king-bolt, and a clip, $a^4$, riveted in place to embrace the lower end of the bolt.

From the foregoing description it will be perceived that I produce an entire wagon-frame, that is to say, a frame comprising all the necessary running gear of a wagon which consists of but five pieces.

Having thus described my invention, what I claim is—

1. A hollow metal axle having on its upper side a longitudinal web or bolster formed integral therewith.

2. A hollow metal axle having integral therewith an overlying longitudinal web or bolster flanged along its top.

3. A metal axle and a longitudinal web or bolster thereon, both formed in one piece.

4. A metal axle having thereon and integral therewith a longitudinal web or bolster and standards at its ends.

5. A combined axle and bolster consisting of a single bar of metal longitudinally flanged at the upper and lower edges, and having the lower flanges bent into the form of a hollow axle.

6. A bolster composed of a flanged bar having its flanges cut loose at the ends to serve as springs.

7. A bolster, its standards, and springs formed from a single piece, substantially as described and shown.

8. An axle, bolster, standards and springs formed from a single piece of metal substantially as shown.

9. The rear axle having integral therewith the overlying rib or bolster with ears punched therefrom for the attachment of the reach.

10. In combination with the axle, the longitudinal rib or bolster formed integral therewith and provided with corrugations.

11. The metal axle consisting of the flanged bar having its lower flanges bent into an axle, and its ends reduced to conical form.

12. The tubular metal axle having its ends reduced to conical form and upset to form the internal shoulders.

13. The tubular axle having at each end a spindle integral therewith, and a shoulder at the inner end of the spindle in combination with an internal strengthening tube projecting outward beyond the end of the axle and extending inward beyond the shoulder.

14. In combination with the tubular axle, the internal strengthening tube its inner end screwed into place within the axle and its outer end projected beyond the axle and threaded to receive a nut.

15. The reach consisting in a single metal bar in ⊢ form in cross-section, having its rear end divided longitudinally and vertically and spread horizontally.

16. In combination with the rear axle and the bolster or sand-board with lips thereon, the divided metal reach having its rear ends secured to the lips, substantially as shown.

17. The combined sway-bar and hounds consisting of a metallic bar of the angular form shown, divided horizontally and separated vertically, whereby it is adapted for the passage of the reach therethrough and provided with broad bearing faces to act upon the reach.

18. In combination with the front axle having the web or bolster and its lips integral therewith, the hounds extended through the web and secured to the lips substantially as shown.

19. The combined sway bar and hounds formed in one piece with the lips thereon for attachment to the axle.

20. A metal axle and bolster made in one piece, the cross section of the bolster being substantially T shaped.

In testimony whereof I hereunto set my hand, this 25th day of July, 1891, in the presence of two attesting witnesses.

WILLIAM P. BETTENDORF.

Witnesses:
P. W. RECK,
E. D. CLARK.